United States Patent
Rummel et al.

(10) Patent No.: US 11,414,566 B2
(45) Date of Patent: Aug. 16, 2022

(54) LOW TEMPERATURE CURE SILICONE RELEASE COATINGS

(71) Applicant: WACKER CHEMIE AG, Munich (DE)

(72) Inventors: Timothy Rummel, Saline, MI (US); Kathleen Beekel, Adrian, MI (US); Christine Klingler, Pittsford, MI (US); Keith Stowell, Morenci, MI (US)

(73) Assignee: WACKER CHEMIE AG, Munich (DE)

( * ) Notice: Subject to any disclaimer, the term of this patent is extended or adjusted under 35 U.S.C. 154(b) by 168 days.

(21) Appl. No.: 16/758,620

(22) PCT Filed: Oct. 24, 2017

(86) PCT No.: PCT/IB2017/056596
§ 371 (c)(1),
(2) Date: Apr. 23, 2020

(87) PCT Pub. No.: WO2019/081963
PCT Pub. Date: May 2, 2019

(65) Prior Publication Data
US 2021/0179888 A1   Jun. 17, 2021

(51) Int. Cl.
*C08G 77/12* (2006.01)
*C09D 183/04* (2006.01)
*C09J 7/40* (2018.01)
*C08G 77/20* (2006.01)

(52) U.S. Cl.
CPC ......... *C09D 183/04* (2013.01); *C08G 77/12* (2013.01); *C08G 77/20* (2013.01); *C09J 7/401* (2018.01); *C09J 7/405* (2018.01); *C09J 2423/006* (2013.01); *C09J 2483/005* (2013.01)

(58) Field of Classification Search
CPC ......... C08G 77/12; C08G 77/20; C08L 83/04; C09D 183/04
See application file for complete search history.

(56) References Cited

U.S. PATENT DOCUMENTS

| | | |
|---|---|---|
| 2009/0171055 A1 | 7/2009 | Kilgour et al. |
| 2011/0274934 A1* | 11/2011 | Yamamoto ............. C08G 77/20 428/447 |
| 2017/0349717 A1 | 12/2017 | Ziche et al. |

FOREIGN PATENT DOCUMENTS

| | | |
|---|---|---|
| EP | 2385085 B1 | 1/2017 |
| EP | 3159379 A1 | 4/2017 |
| WO | 9210543 A1 | 6/1992 |
| WO | 2016030325 A1 | 3/2016 |

* cited by examiner

*Primary Examiner* — Kuo Liang Peng
(74) *Attorney, Agent, or Firm* — Brooks Kushman P.C.

(57) ABSTRACT

Organopolysiloxane release coatings employing a higher molecular weight organopolysiloxane crosslinker having Si—H groups on not more than 67 mol percent of all siloxy groups of the organopolysiloxane crosslinker, and a lower molecular weight aliphatically unsaturated organopolysiloxane, cured by hydrosilylation with a hydrosilylation catalyst, produce strongly anchored release coatings which are able to be cured for shorter times and/or lower temperatures, and still offer a lower level of extractables than advanced release coatings employing precrosslinked unsaturated silicones.

14 Claims, 1 Drawing Sheet

LOW TEMPERATURE CURE SILICONE RELEASE COATINGS

CROSS-REFERENCE TO RELATED APPLICATION

This application is the U.S. national phase of PCT Application No. PCT/IB2017/056596 filed on Oct. 24, 2017, the disclosure of which is incorporated in its entirety by reference herein.

BACKGROUND OF THE INVENTION

1. Field of the Invention

The invention pertains to addition curable silicone release coatings having low curing temperatures which are especially useful for applying to polyolefin substrates.

2. Description of the Related Art

Release coatings are in widespread use. In the context of the present invention, a release coating is an abhesive coating which is applied onto a substrate, which may also be called a "carrier," and is designed to facilitate a controlled and generally easy release of an adherend, or to prevent adherence of an adherend in the first place. Thus, for example, in the commercial production of pressure sensitive labels, a paper substrate is commonly used, this substrate is coated with a release coating, and then the adherend, for example a paper label with its backside coated with a pressure sensitive adhesive, is applied over the release coating. Upon use, the labels are peeled away from the release coating without causing the release coating to separate from the substrate, and then the label is adhered to an article desired to be labeled.

The concept of applying a release coating is very old, and for literally hundreds of years, release coatings containing wax or variety of oils have been used. More modernly, numerous new release coatings have been developed. The type of release coating employed for any particular purpose is dependent on numerous factors, such as the nature of the substrate to which the release coating is applied, and the nature of the adherend which is desired to be applied to the release-coated substrate, or which is desired to be prevented from sticking to a release coated substrate. Substrates differ widely in both their chemical nature as well as their physical embodiments. Even in the case of paper, there is considerable difference between, for example, Kraft paper, calendared paper, glassine paper, coated paper, and uncoated paper. Polymer substrates have widely varying polarities, ranging from extremely nonpolar PTFE substrates and hydrophobic polyolefins, through polyvinyl acetals, to more polar polymers such as polyureas, polyurethanes, and polyesters. Metal foils are also sometimes used as substrates. Each of these types of substrates presents unique problems with respect to the use of release coatings, since the release coatings must adhere to the substrate more strongly than to the adherend so that they remain on the substrate after the adherend is removed.

Moreover, the adherend itself varies widely in terms of its chemical and physical properties. Adherends such as asphalt and bitumen are notoriously tacky, and tend to adhere strongly to nonpolar surfaces, with the possible exception of highly fluorinated polymers such as PTFE. Pressure sensitive adhesives, which ordinarily are found on the backside of adhesive labels, are designed purposefully to be tacky. Other possible adherends include foodstuffs, including meat and poultry, as well as baked goods, candy, and the like. In these cases, non-adherence is desired. Many foodstuffs are easily removed from nonpolar release coatings, but stick strongly to release coatings which are more polar. On the other hand, nonpolar release coatings are generally more adherent to products which themselves are nonpolar.

In addition to the variables discussed above, a suitable release coating must be industrially and commercially acceptable. From an industrial/commercial standpoint, cost is a major factor in the choice of a release coating, which must be balanced against performance. As one might expect, the cost of a release coating is not only dependent upon the cost of the raw materials of the coating itself, but is also dependent upon the type of application required to apply the coating to the substrate, and if curing is involved, the time and temperature of the cure cycle. For example, polyethylene as a release coat requires no cure, but does require application from the melt, i.e. as an extruded film. The cost of the extruder raises the cost of applying the film to the substrate. For release coatings of substances which must be dissolved in solvent, many types of coating apparatuses may be used. However, the use of organic solvents raises environmental concerns, and a certain amount of time must be provided in order to evaporate the solvent. For thermoset polymers, these are generally capable of being applied by numerous methods, but require a defined curing cycle, generally at elevated temperature. At a line speed of only 50 m/s, for example, an increase in curing time of only one second requires that the coated substrate travel an additional 50 m through the curing oven. As can be readily seen, increasing the distance of travel within the oven requires constructing a larger oven, which is often impractical or uneconomical. Longer curing cycles also consume more energy.

Silicones have been widely used for variety of release coatings over the past several decades. Silicones have the advantages of high thermal stability, exceptionally low toxicity, and low surface energy, thus providing for very efficient release with respect to many adherends. Silicone oils and waxes have the advantage that no curing time is necessary, although at times organic solvents may be required to provide a coatable composition. Silicone oils and waxes have the disadvantage that they are not chemically bonded to the substrate, and may also migrate through substrates such as paper. They may also sometimes migrate into the adherend. Thus, the bulk of silicone release coatings used today are curable (cross-linkable) silicones.

Curable silicones useful for release coatings can be divided into three rather different categories. One category consists of condensation-curable coatings, which may be one-component (RTV-1) or two-component (RTV-2) systems. Both these systems contain silicone polymers bearing alkoxysilyl groups which, in addition to reacting to crosslink and cure the polymer system, can also react with reactive groups in and/or on the substrate. Such systems bond strongly to paper, for example. However, the curing time of condensation curable silicones tends to be long, even when water is added purposefully, and thus these types of silicone release coatings form only a minor proportion of the silicone release coatings used today.

Addition-curable silicone release coatings generally cure more rapidly than condensation-curing silicones, and are thus more suitable for use as release coatings. Addition-curable silicones may be divided into those which cure by the free radical addition of two ethylenically unsaturated groups, and those which cure by hydrosilylation. In the former case, the free radicals are generally supplied by the thermal decomposition of a peroxide. These compositions have the advantage of good stability ("pot life"), provided the storage temperature and the temperature upon use, prior to coating, can be kept close to room temperature or below. At elevated temperature, the organic peroxides decompose to form free radicals which rapidly cure the composition. Such addition-curable silicone release coatings have a wide variety of uses, but these generally do not include, for example, the food industry, or uses for many medical and consumer products, due to the toxicity, and to the generally offensive odor associated with the organic peroxides and their decomposition products.

The second type of addition-curable silicone release coating is that of silicones which cure by hydrosilylation. In these types of silicones, a silicone component bearing silicon-bonded hydrogen atoms ("Si—H" groups) reacts, in the presence of a hydrosilylation catalyst, with another component having two or more aliphatically unsaturated groups, such as vinyl groups. The second component may be an organic polymer bearing the unsaturated groups, or may be a silicone component bearing the unsaturated groups. The hydrosilylation catalyst is generally platinum or a compound or complex thereof. Platinum hydrosilylation catalysts which are activated by ultraviolet light are also possible. An advantage of addition-curable silicones which cure by hydrosilylation is that no toxic peroxides are present. Disadvantages include high catalyst cost, and long curing cycles, elevated curing temperatures, or both. Addition-curable silicone release coatings which cure by hydrosilylation are, in general, suitable for many uses, including uses which involve contact with foodstuffs or for medical equipment. It is to this type of release coating that the subject invention is addressed.

In the past, and as indicated above, long curing cycles and elevated temperature are one disadvantage of hydrosilylation-curing silicones. The higher the curing temperature, the more energy intensive and costly is the curing cycle. Also, the larger the curing oven, for example large ovens necessary to accommodate long curing times at high line speeds, the more costly is the cure of the release coatings. The industry has long struggled to attempt to provide addition-curable silicone release coatings which cure by hydrosilylation, and cure at low temperatures and over short periods of time, but have sufficiently long pot life to be technically feasible. Despite extensive research in this area, these diametrically conflicting, long sought aims have not been met. Moreover, decreasing cure time and/or temperature may have adverse consequences on adherence of the release coating to the substrate.

Addition-curable silicone systems which cure by hydrosilylation and are usable for release coatings have employed low molecular weight crosslinkers which contain a high proportion of silicon-bonded hydrogen. Such low molecular weight crosslinkers are commercially available, but are relatively expensive to manufacture. These crosslinkers in general, contain one silicon-bonded hydrogen atom per siloxy group in the Si—H-functional silicone oligomer. The component containing aliphatically unsaturated groups is generally a high molecular weight vinyldialkylsiloxy-terminated polydiorganosiloxane, usually a high molecular weight vinyldimethylsiloxy-terminated polydimethylsiloxane. Such high molecular weight vinyl-terminal linear silicones are widely available. In order to increase the cure rate of such systems, "pre-crosslinked" vinyl-functional silicones have been developed which have a "comb," "dendritic" or "star" structure, vinyl groups being present at the chain ends of the branches of the polymer. This type of system represents the "state-of-the-art" with respect to cure time and temperature. However, the lower cure time and/or lower cure temperature provided by such systems which involve the use of pre-crosslinked silicones is still deficient, and in need of improvement. Furthermore, the industrial preparation of the "pre-crosslinked" silicones is associated with increased expense. If the cure time/temperature is not adequate, the coating may contain a large quantity of unreacted components, generally termed "extractables." Some of these extractables may escape in the curing oven, eventually necessitating time-consuming and difficult cleaning of the ovens, but more importantly, the unreacted silicones may migrate into the adherend, or may cause the release properties of the release coating to vary over time. All of these are considered to be quite undesirable. Significant extractables content may cause migration into surrounding areas, including the adherend. This is especially problematic in the food industry.

It would be desirable to provide a silicone release coating which is an addition-curable coating which cures by hydrosilylation, but which offers short curing times at low curing temperatures, and yet which provides a release coating having a low extractables content.

SUMMARY THE INVENTION

It has now been surprisingly and unexpectedly discovered that addition-curable silicone release coatings which cure by hydrosilylation and which employ a high molecular weight Si—H-functional silicone with a limited proportion of Si—H functional siloxy groups, and a lower molecular weight silicone bearing aliphatically unsaturated groups, are able to be cured at lower temperatures and over shorter curing times, while simultaneously decreasing the proportion of volatiles in the cured coating. Adherence to the substrate, particularly polyolefin substrates, is surprisingly and unexpectedly increased as well.

DETAILED DESCRIPTION OF THE PREFERRED EMBODIMENTS

The addition-curable release coatings of the invention cure by hydrosilylation in the presence of a hydrosilylation catalyst, and include:

A) at least one organopolysiloxane bearing on average, at least two terminal aliphatically unsaturated groups;

B) at least one organopolysiloxane crosslinker bearing silicon-bonded hydrogen ("Si—H"), wherein no more than 67 mol percent of siloxy groups in the organopolysiloxane crosslinker contain Si—H groups;

C) at least one hydrosilylation catalyst; and

D) optionally, a hydrosilylation inhibitor, wherein the chain length of the organopolysiloxane crosslinker B) exceeds the chain length of the organopolysiloxane A), and the mol ratio of Si—H groups to aliphatically unsaturated groups is at least about 2:1, more preferably 2.5:1, and most preferably at least 3:1. These release coating compositions cure faster, and/or at a lower temperature, than state of the art release coatings, which is surprising and unexpected, but even more surprising and unexpected, may offer increased adherence to the substrate at the same time.

The composition may further contain other ingredients useful in addition curable organopolysiloxanes compositions curable by hydrosilylation, including, but not limited to dyes, pigments, fillers, plasticizers, antioxidants, light stabilizers, rheology adjusting agents, release adjustment agents, tackifiers, biocides, other organopolysiloxanes, including linear, branched, or resinous organopolysiloxanes, these other organopolysiloxanes containing aliphatically unsaturated groups or being free of such groups, or containing Si—H groups or being free of Si—H groups, provided that the other organopolysiloxanes do not correspond to organopolysiloxanes A) or B), for example but not by limitation, organopolysiloxanes free of both Si—H groups and aliphatically unsaturated groups.

The organopolysiloxanes A) contain a plurality of terminal aliphatically unsaturated groups, on average at least two of such groups, and preferably correspond to the general formula:

(I)

where a is 1 or 2, b is 1 or 2, and the sum of a+b is 3; m is 5 to 200, preferably 10 to 70, and more preferably 15 to 40; n is 0-10, preferably 0-5, more preferably 0-3, and most preferably 0;
$R^1$ is an aliphatically unsaturated hydrocarbon group;
R is a $C_{1-20}$ hydrocarbon group containing no aliphatic unsaturation;
$R^3$ is R or an organosiloxy or polyorganosiloxy group containing —$OSiR_2$— siloxy groups and terminated by an $R_3SiO$— group or by a $R^1{}_aR_bSiO$— group, where a, b, and the sum a+b have the meanings previously given.

The organopolysiloxane polymers (A) are linear or lightly branched silicone polymers having terminal aliphatically unsaturated groups, preferably one such group at each polymer chain terminus. Linear polymers (A) are preferred. For lightly branched polymers A), organosiloxy or polyorganosiloxy groups may be non-functional, or may contain aliphatic unsaturation. Non-functional branches, when present, are preferably terminated by groups such as trimethylsilyl groups.

Suitable hydrocarbon groups R are optionally substituted $C_{1-20}$ hydrocarbons, including alkyl groups such as methyl, ethyl, n-propyl, and isopropyl, butyl groups such as the n-butyl group, pentyl groups such as the n-pently group, hexyl groups such as the n-hexyl group, heptyl groups such as the n-heptyl group, octyl groups such as the n-octyl, isoctyl, and 2-ethylhexyl groups, decyl groups, dodecyl groups, octadecyl groups, and eicosyl groups; cycloalkyl groups such as cyclopentyl methylcyclopentyl, cyclohexyl, and methylcyclohexyl groups; aryl groups such as phenyl, naphthyl, and anthracyl; and aralkyl groups such as the benzyl and α- and β-phenylethyl groups, among many hydrocarbon groups which are suitable. Although not shown in Formula (I), it is also possible to include R groups with more than 20 carbon atoms in addition to $C_{1-20}$ hydrocarbon groups, but this is not preferred.

If the hydrocarbon groups are substituted, preferred substituents are halogens such as bromine, chlorine, and fluorine, cyano groups, acyl groups, epoxy groups, and the like, preferably cyano and chloro groups. Examples of substituted hydrocarbons are the chlorphenyl, trifluoromethyl, hexafluoropropyl, heptafluoropropyl, o, m, and p-chlorotolyl, and the like.

Preferred R groups are the methyl, ethyl, n-propyl, hexafluoropropyl, heptafluoropropyl, ethylphenyl, and phenyl groups. Methyl groups are most preferred.

The aliphatically unsaturated groups $R^1$ include $C_{2-18}$ aliphatically unsaturated hydrocarbons such as vinyl, allyl, 2-propenyl, 3-butenyl, 5-hexenyl, and propargyl groups, and in particular, aliphatic hydrocarbons with terminal ethylenic unsaturation. Preferred aliphatically unsaturated hydrocarbons $R^1$ are the vinyl and allyl groups, most preferably the vinyl group. The ethylenic or ethylynic unsaturation is preferably terminal.

$R^3$ is preferably R, more preferably methyl. $R^3$ may also be an organosiloxy group such as $R_3SiO$— or $R^1R_2SiO$—, or may be an organopolysiloxane group such as one of the general formula:

(III)

where o is from 0 to 50, preferably 1 to 30. Most preferably, $R^3$ is R, in otherwords, the organopolysiloxanes A) are linear, unbranched molecules, or essentially unbranched. In this context, "essentially unbranched" means that organosiloxy or organopolysiloxy branches are not purposefully added during synthesis of organopolysiloxanes A). The number of siloxy units containing $R^3$ moieties is, on average, preferably less than 5, more preferably less than 4, yet more preferably less than 3, and still more preferably, 2 or less. Most preferably, the organopolysiloxanes (A) are unbranched, i.e. contain on average no groups $R^3$ which are siloxy or polysiloxy groups. By this latter term is meant that the number of $R^3$ siloxy or polysiloxy groups is essentially zero, only containing branched siloxy groups as an unavoidable artifact of organopolysiloxane synthesis.

The organopolysiloxanes (A) are available commercially or are preparable by known methods of organosilicon chemistry.

The organopolysiloxane crosslinkers B) preferably are of the general formula (II)

where R is as defined previously, p is from 10 to 200 and preferably from 40 to 100, and q is from 5 to 60, where the p diorganosiloxy groups, and q hydrogen organosiloxy groups are distributed in any manner, preferably randomly, and preferably not in block form. R is preferably methyl, ethyl, or phenyl, more preferably methyl. In the crosslinker (II), c is 0 or 1, preferably 0, d is 2 or 3, preferably 3, and the sum of c+d is 3. Organopolysiloxanes/crosslinkers (B) where one or both of the tri(hydrocarbon)-substituted siloxy or silyl groups $R_3SiO$— or $R^3Si$— are present, are preferred. Most preferably, there are no terminal groups containing silicon-bonded hydrogen. The mole percentage of siloxy groups bearing silicon-bonded hydrogen is preferably at least 5 mole percent, more preferably at least 15 mole percent, and most preferably at least 25 mole percent. The molecular weight of the organopolysiloxane (B) and/or its number of siloxy units, is higher than that of organopolysiloxane (A).

The organopolysiloxanes (B) are available commercially or are preparable by known methods of organosilicon chemistry.

Hydrosilylation catalysts C are well-known, and are generally elements of the platinum group of metals, or compounds or complexes thereof. Examples of catalysts (C) include metallic and finely divided platinum which can be present on supports such as silicon dioxide, aluminum oxide or activated carbon, compounds or complexes of platinum, for example platinum halides, e.g. $PtCl_4$, $H_2PtCl_6.6H_2O$, $Na_2PtCl_4.4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6.6H_2O$ and cyclohexanone, platinum-vinylsiloxane complexes, in particular platinum-divinyltetramethyldisiloxane complexes with or without detectable inorganically bound halogen, bis(gamma-picoline)platinum dichloride, trimethylenedipyridineplatinum dichloride, dicyclopentadieneplatinum dichloride, (dimethyl sulfoxide)ethyleneplatinum(II) dichloride and also reaction products of platinum tetrachloride with olefin(s) and primary amine or secondary amine, or primary and secondary amine, for example the reaction product of platinum tetrachloride dissolved in 1-octene with sec-butylamine, or ammonium-platinum complexes.

A particularly preferred catalyst (C) is the so-called Karstedt catalyst, i.e. a Pt(0) complex, in particular the platinum(0)-1,3-divinyl-1,1,3,3-tetramethyldisiloxane complex of the formula $Pt_2[[(CH_2=CH)(CH_3)_2Si]_2O]_3$.

Optional inhibitors D are also well-known. In many applications, it is preferable to employ inhibitors which are acceptable for contact with foodstuffs. Preferred inhibitors are ethynylcyclohexanol ("ECH") and Dehydrolinalool®, available from BASF AG.

The addition-curable release coatings of the invention may include (E) fillers, in amounts of up to 50% by weight of the total weight of the release coating, more preferably, in increasing order of preference, up to 40% by weight, 30% by weight, and 10% by weight. Most preferably, fillers are absent, or are contained in amounts of less than 10% by weight, more preferably less than 5% by weight. Fillers may be added to alter the viscosity of the uncured release coating compositions, to alter its rheological profile (e.g. thixotropy, dilatency), or to alter release properties. The latter are most influenced by non-reinforcing fillers, whereas the former are most influenced by reinforcing fillers.

Both reinforcing and non-reinforcing fillers may be composed of the same materials, examples of which are silica, alumina, Mania, and mixtures thereof, iron oxides, talc, mica, carbon, etc. Reinforcing fillers in the context of this application have BET surface areas greater than 50 $m^2/g$, more preferably greater than 100 $m^2/g$, and yet more preferably about 200 $m^2/g$ or more. Non-reinforcing fillers have BET surface areas of less than 50 $m^2/g$. Preferred examples of reinforcing fillers are fumed and colloidal silicas having surface areas greater than 50 $m^2/g$, preferably greater than 100 $m^2/g$, and most preferably in the range of 200-300 $m^2/g$. Preferred non-reinforcing fillers include ground minerals such as quartz, limestone, marble, dolomite, clay minerals, talc, etc. Both types of fillers may be used in their natural state, which is generally somewhat hydrophilic, or may be hydrophobicized by techniques well known to those skilled in the art, for example by coating with wax, metal stearates, silicone fluids, etc., or by reactively coating with reactive silicones, for example, those containing silicon-bonded alkoxy groups, or with reactive silanes such as alkylchlorosilanes, alkylalkoxysilanes, hexamethyldisilizane, etc. The modification of the fillers may take place externally, as is often the case, or the modification may take place in situ. Both these processes are well known and widely used.

Pigments (F) may be employed to alter the color of the release coatings, which, in the absence of fillers, are generally colorless and transparent. Once fillers are present, depending upon the amount and particle size of the fillers, the compositions may range from transparent through translucent, to opaque. In general, one skilled in the art of silicone release coatings does not consider conventional fillers such as those of silica, alumina, or titanium, to be pigments, since they do not provide any color to the composition, and may even produce transparent compositions. Typical pigments include organic pigments, which are not preferred, particularly where contact with foodstuffs might occur, and inorganic pigments such as the various iron oxide pigments, carbon blacks, etc. By the same token, dyes (G), both natural and synthetic, may be used. In this respect, the difference between a dye and a pigment is that although both produce colored release coating compositions, dyes are soluble in the polymer matrix while the pigments are at most partially soluble, and in major part remain dispersed in the polymer matrix. Preferably, the inventive release coating compositions contain a maximum of 5 wt. %, based on the total weight of the release coating, of dyes (G) and/or pigments (F) in total, more preferably less than 3 wt. %, and most preferably less than 2 wt. %. Preferably, no dyes and/or pigments are present.

Plasticizers (H) may include any plasticizers useful in addition-curable organopolysiloxane compositions. Plasticizers may be used to dilute the composition, and thereby reduce its cost, or may be used to alter release properties. Plasticizers suitable for use include oligomeric organopolysiloxanes such as trimethylsilyl-terminated polydimethylsiloxanes. Low molecular weight organopolysiloxanes, whether linear, branched, or cyclic, are not preferred. The oligomeric organopolysiloxanes are preferably substantially non-volatile. With respect to non-silicone plasticizers, organic plasticizers having boiling points exceeding 200° C. are preferred. Examples of these include long chain alkanols, alkanol esters and ethers, amides, natural oils such as safflower oil, olive oil, rapeseed oil, sunflower oil, and other natural and/or synthetic di- and triglycerides, as well as long chain and preferably relatively hydrophobic polyoxyalkylene polymers such as polyoxypropylene glycols. Both reactive and nonreactive plasticizers may be used. Non-reactive plasticizers contain no functional groups which will react with the coating composition components during storage or cure of these components. Thus, these components generally do not contain any silicon-bonded hydrogen groups, nor any aliphatically unsaturated groups. They may, for example, contain groups such as amide, hydroxyl, cyano, primary, secondary, and tertiary amino, ester, keto, or other, groups, in addition to merely hydrocarbon groups such as alkyl groups. Further examples of non-reactive plasticizers include those used for addition to polyvinyl acetals for use in preparing glass laminates, e.g. phosphate esters, dicarboxylic acid esters, carboxylic acid esters of glycols, and the like.

Reactive plasticizers (H') have an advantage in that they cannot migrate, nor can they be absorbed by the substrate, or by the adherend. Reactive plasticizers have at least one reactive functional group which reacts with one of the ingredients of the release coating. In general, these reactive plasticizers will either have only one such functional group, thus preventing the occurrence of undesirable crosslinking, or may have two or more functional groups, with only one of these two or more functional groups being highly reactive. The additional functional groups may, for example, the less reactive chemically, or may be sterically hindered from reacting. Preferred reactive plasticizers are long chain aliphatic hydrocarbons containing terminal ethylenic unsaturation, or polyoxyalkylene polyethers containing terminal unsaturation.

When plasticizers are present, they are preferably present in amounts of less than 30 wt. % based on the total weight of the release coating composition, more preferably less than 20 wt. %, yet more preferably less than 10 wt. %, and most preferably less than 5 wt. %. Plasticizers are preferably not present in the release coating compositions of the invention. This applies to both reactive and nonreactive plasticizers.

Antioxidants (I) and light stabilizers (J) may be present, particularly antioxidants. Antioxidants and light stabilizers are well known, and available from numerous sources. They are essentially too numerous and widely available to individually mention. However, it is noted that when either antioxidants and/or light stabilizers are employed, it is preferable that these be approved for use in applications and contact foodstuffs, medical devices, etc. Suitable antioxidants include, for example, α-tocopherol, ascorbic acid, propionic acid, and alkylated hydroxytoluenes, in particular BHT. When antioxidants and light stabilizers are present, they are each present, preferably, in amounts of less than 5 wt. % based on the total weight of the release coating, more preferably less than 3 wt. percent, and most preferably in the range of 0-2 weight percent. The presence of light stabilizers is not preferred. Whether antioxidants are employed or not depends largely upon the storage and curing conditions which the release coating compositions will experience, and the expected storage temperatures of the release-coated substrates. Often, no antioxidants (thermal stabilizers) need be present.

Rheology adjusting agents (K) include substances which reduce or increase the viscosity of the coating compositions. Release adjusting agents which reduce viscosity include, for example, organic solvents (K') such as the lower alkanols, esters, ketones, hydrocarbons, and the like. If organic solvents are to be added, due to the environmental constraints on VOCs, it is desirable to use solvents which have little effect environmentally, such as tertiary butyl acetate. Other preferred organic solvents include, especially, ethanol, due to its relatively low toxicity, and its ready degradability in the environment. When present, organic solvents can be used to an extent of up to 30 wt. % based on total weight of the coating composition, preferably up to 20 wt. %, and more preferably up to 10 wt. %. Organic solvents are preferably absent. Rheology adjusting agents which increase the viscosity, as this term is used here, do not include inorganic particles which may be described as fillers, and which may indeed cause a viscosity increase. Rather, in the sense of the present invention, rheology adjusting agents which increase the viscosity of the coating composition are reactive or nonreactive high molecular weight polymers which interact with themselves, or with other components of the coating composition to increase the viscosity thereof. Examples of such high molecular weight components include silicone gums and other generally soluble high molecular weight polymers, including polyurethanes, especially copolymers containing both organopolysiloxane and polyurethane and/or polyurea groups. In general, it is not necessary to increase the viscosity of the coating compositions, and therefore, rheology adjusting agents which increase the viscosity are preferably absent. When these are present, they are generally present in amounts less than 20 weight percent, more preferably less than 10 wt. %, and most preferably less than 5 wt. %, based on the weight of the coating composition.

Release adjusting agents (L) are known in the art, and generally include silicone resins of a variety of types. One example is CRA® 17, available from Wacker Chemie AG. Silicone resins such as MT, T, and MQ resins are preferred, these preferably containing lower alkyl groups, most preferably methyl groups. Such release adjusting agents generally contain a silicone resin such as an MQ resin, often in conjunction with silicone fluids such as vinyl-functional fluids, or non-volatile α-olefins such as α-decene, undecene, 1-dodecene, and the like. Other commercially available release adjusting agents are CRA® 45 AMA and CRA® 42, both available from Wacker Chemie AG. When release adjusting agents are used, they are preferably used in amounts of less than 60 wt. % based on the total weight of the coating composition, more preferably less than 40 wt. %, and most preferably less than 20 wt. %. Release adjusting agents are preferably absent.

Tackifiers (L') are a subclass of release adjusting agents, which generally increase the release force of the compositions. Such tackifiers are well known, and include both natural and synthetic resins of many types, which are available commercially from numerous sources. Modified natural rosins are often used. When tackifiers are used, they are preferably used in amounts of less than 10 wt. % based on the total weight of the coating composition, more preferably less than 5 wt. %, and most preferably less than 2 wt. %. Most preferably, tackifiers are absent from the compositions.

Biocides (M) may be present in the compositions. Biocides are principally useful as "in can" preservatives to prevent microbial growth in compositions during shipping and storage. Biocides which are useful in organopolysiloxane compositions are well known, and commercially available. Common biocides include isothiazolinones. It is not preferred to add biocides unless the particular component of the release coating compositions has proven to be susceptible to microbial contamination. If biocides are to be added, it is preferred that the biocides are one or more of those which are approved by governmental agencies for contact with foodstuffs, medical devices, the skin, etc. Such biocides are well known.

The actual composition of the release coatings is relatively flexible. Components (A) and (B), and a hydrosilylation catalyst (C), are necessary ingredients. Depending upon the molecular weights and viscosities of these ingredients, further ingredients may or may not be necessary. If the compositions are designed to be thermally curable compositions, e.g. those containing a thermally activatable hydrosilylation catalyst, then the compositions should be packaged in at least two parts or components, no part or component containing all of organopolysiloxanes (A), organopolysiloxanes B), and the hydrosilylation catalyst. In other words, the majority of embodiments which are destined to be thermally cured, will be multiple part compositions, preferably 2 part compositions. However, if a sufficient amount of a hydrosilylation inhibitor (D) is also present, particularly when storage conditions can be predicted with certainty, then all of these components, together with the hydrosilylation inhibitor, can be packaged as a one component composition.

Any combinations of ingredients may be used as long as all of A, B, and C are present, preferably also D. Preferred combinations of ingredients include, between one or a multiplicity of components, A, B, and C; A, B, C, and D; A, B, C, and E; A, B, C, D, and E; A, B, C, and H; A, B, C, D, and H; A, B, C, and I; A, B, C, D, and I; and A, B, C, D. E, H, and K.

The compositions may be coated by any known coating method, including, but not limited, to spray coating flexographic printing, roll coating, dip coating, doctor blade coating, falling film coating, and the like, and cured for time periods of, for example, 0.5 seconds to 1 minute, more preferably 1-8 seconds, at temperatures of 60° C. or lower to 160° C. or higher, preferably 70° C. to 120° C., to achieve a low extractables content, preferably less than 10% by weight based on the weight of the coating, preferably 5 wt. % or less, and also preferably, 3% by weight or less. Curing at low temperatures less than 100° C. while achieving these extractables levels is highly preferred.

The compositions may also be curable by light, particularly ultraviolet light. In this case, the hydrosilylation catalyst will include at least one light-activated hydrosilylation catalyst. In this case, provided that the light-activated hydrosilylation catalyst has little thermal hydrosilylation catalyzing ability, an inhibitor may be dispensed with, and a storage stable one component composition may be easily provided. Examples of suitable light-activated hydrosilylation catalysts are disclosed in WO 2016/030325 A1, which is incorporated herein by reference for this purpose, and the references cited therein. Such catalysts are commercially available or preparable by methods common in organometallic chemistry. Many of such catalysts are cyclopentadienyl complexes of platinum.

Other reactive or nonreactive organopolysiloxanes, including both linear, branched, cyclic, and resinous organopolysiloxanes, may be added to the composition in minor qualities, not to exceed 30 wt. % based on the total weight of the coating composition. When such ingredients are added, they frequently are used to provide changes in viscosity, release properties, etc., as previously described. However, the addition of such ingredients generally adds cost to the compositions due to the necessity of obtaining, storing, and admixing these additional components. Thus, the use of additional organopolysiloxane components is not preferred, unless necessary to alter the physical and/or chemical properties and/or release properties of the composition.

The inventive release coating compositions can be applied neat, dissolved in solvent, or as an aqueous emulsion. The particular form of the composition may be selected taking into account the existing coating and curing facilities which are available.

In solvent-borne compositions, the neat components preferably comprise from 3 to 70 wt. % of the total composition, more preferably 5 to 60 weight percent, and most preferably 10 to 50 weight percent. Any suitable solvent or solvent mixture may be used, but preference is given to environmentally benign solvents such as ethanol and tertiary butyl acetate, and other low ozone depleting solvents. Other solvents include petroleum ethers (relatively volatile hydrocarbon fractions) and other fractions which are sufficiently volatile so as to be easily removed from the coating prior to and/or during cure. Such solvents include, but are not limited to, toluene, xylene, $C_5$-$C_{12}$ hydrocarbon fractions, etc. Such solvents are well-known and commercially available.

Aqueous emulsions and/or dispersions may also be used. In such formulations, it is preferable to emulsify the Si—H-containing components and ethylenically unsaturated components separately, and then combine the respective emulsions, preferably just prior to use. However, at least in theory, the complete neat (single component) composition containing all reactive ingredients may also be emulsified, particularly when a higher concentration of catalyst inhibitor. In this case, it is desirable to keep the emulsification temperature low so as to avoid premature reaction. This may be accomplished by cooling the mixer, which is usually a high shear mixer, during emulsion preparation. It is preferred that multiple emulsions be used, with no dispersed phase simultaneously including catalyst, ethylenically unsaturated organopolysiloxanes, and Si—H crosslinker, except in minor amounts which cannot be avoided.

The aqueous emulsions generally require an effective amount, for example from 1 to 20 weight percent based on the total weight of the emulsion, preferably 3 to 15 weight percent, of one or more surfactants to aid in dispersing the various organopolysiloxanes and to maintain the emulsion in stable form without creaming or separating into phases. Some separation or creaming is tolerable provided that the composition may be rendered homogenous by simple agitation.

Any surfactant or combination thereof may be used, including anionic, cationic, zwitterionic, and non-ionic surfactants, and protective colloids as well. Gemini-type non-ionic surfactants may also be used. The non-ionic surfactants are preferably polyoxyethylene ethers preparable by oxyalkylating an alkanol, phenol, or other hydroxy-functional organic compound with ethylene oxide, propylene oxide, or mixtures thereof, to form the well-known random, block, and/or block/random polyether surfactants. Polyoxyalkylated aliphatic alcohols are preferred surfactants. Often, a mixture of surfactants, one with a relatively high HLB and one with a lower HLB are suitable. It may be useful in some cases to add volatile, water soluble (at the concentrations used) organic solvents to assist in emulsion preparation and/or to speed drying.

Suitable protective colloids are well known, and include natural products such as starches, natural gums, proteins such as gelatin and casein, chemically modified natural products such as methylcellulose, carboxymethylcellulose and the like, and synthetic products such as partially or fully hydrolyzed polyvinyl alcohol, preferably polyvinyl alcohol which is hydrolyzed to an extent greater than 85 mol %, more preferably >90 mol percent. These protective colloids can be used alone, or in conjunction with other dispersants, such as the surfactants described above.

While not preferred, it is also possible to employ inorganic particles which have been only partially hydrophobicized, and thus contain both hydrophilic and hydrophobic domains. Such inorganic particle surfactants, particularly those based on partially hydrophobicized pyrogenic silica, are known. The solids (reactant) concentration in the emulsions may be the same as those in solvent-borne compositions.

The invention will now be illustrated through the use of several, non-limiting examples. In all cases, silicon is tetravalent.

Release compositions are prepared by mixing together the ingredients stated in Table 1. An ordinary blade-type mixer can be used to mix ingredients. The composition is stirred for one minute prior to the addition of the next individual ingredient. The mixing process is not critical, and any mixing protocol can generally be used.

DEHESIVE® 636 is a state-of-the-art "pre-crosslinked," vinyl-functional organopolysiloxane having a viscosity of 300 cPs and an average of two T-branches per molecule, and terminal vinyl groups, available from Wacker Chemie AG and containing 0.18 wt. % ECH as an inhibitor.

Visi 20 is an α,ω-vinyldimethyl-terminated dimethylpolysiloxane with a viscosity of 20 cPs at 25° C., measured using a Brookfield viscometer, according to ASTM D2196.

WACKER® CROSSLINKER 525 is a high molecular weight crosslinker containing silicon-bonded hydrogen on approximately one-third of the siloxy chain units, available from Wacker Chemie AG. The viscosity is 400 cPs at 25° C.

WACKER® CROSSLINKER V 90 is a conventional, low molecular weight, high silicon-bonded hydrogen-content organopolysiloxane containing about 1.1 wt. % of silicon-bonded hydrogen, a viscosity of 35 cPs at 25° C., and having silicon bonded hydrogen on more than 75 mole percent of the repeating siloxy units.

DEHESIVE® 637 is identical to DEHESIVE® 636 except that DEHESWE® 637 does not contain ECH or any other intentionally added platinum hydrosilylation catalyst inhibitor.

ECH is ethynylcyclohexanol.

WACKER® CATALYST C 05 is a complex of platinum metal and vinyl endcapped silicone polymer. It is a platinum hydrosilylation catalyst available from Wacker Chemie AG, supplied as a 0.12 weight percent solution calculated on the basis of elemental platinum in vinyl encapped silicone polymer.

Example 1

The composition ingredients, including a relatively low molecular weight vinyl-terminated organopolysiloxanes, and a relatively high molecular weight Si—H-functional cross-linker having a low proportion of siloxy units containing silicon-bonded hydrogen, were mixed together at room temperature. ECH inhibitor was added, and the mixture stirred until uniform. At this point, the platinum catalyst solution was added. The amounts of the respective ingredients, the amount of catalyst in parts per million, and the SiH:$V_i$ ratio are given in Table 1.

Comparative Example C1

In a manner similar to that used in Example 1, a conventional state-of-the-art release coating composition was produced from DEHESIVE® 636, WACKER® CROSSLINKER V 90, ECH inhibitor, and platinum catalyst. The amounts are given in Table 1.

TABLE 1

| COMPONENT | Comp. Ex. C1 Wt. % | Example 1 Wt. % |
|---|---|---|
| DEHESIVE ® 636 | 90.2 | |
| Visi 20 | | 50.8 |

TABLE 1-continued

| COMPONENT | Comp. Ex. C1 Wt. % | Example 1 Wt. % |
|---|---|---|
| WACKER ® CROSSLINKER 525 | | 47.0 |
| WACKER ® CROSSLINKER V 90 | 6.3 | |
| ECH | | 0.05 |
| WACKER ® CATALYST C 05 | 3.5 | 2.2 |
| Total: | 100.0 | 100.0 |
| [Pt] | 40 ppm | 25 ppm |
| SiH:Vi (Vi = 1) | 1.8 | 4.9 |

Examples 1.1-1.4 and Comparative Examples C1.1-C1.3

The compositions of Example 1 and Comparative Example 1 were coated onto SCK (Super Calendared Kraft Paper) using 3 cm³ samples and a Euclid Coater (NW) set to 45 psi (310 kPa). The coated sheets were placed in a curing oven for various times at various temperatures. The coated sheets were examined on an Oxford Twin X to determine the coating weight. A 3 in×8 in (7.5 cm×20 cm) sample was cut from the sheet and placed in 30 mL of toluene overnight. Samples of the toluene were submitted for flame atomic absorption spectrum graphic analysis using a toluene/xylene flame, calibrated by running known samples, to determine the amount of unreacted silicone components, in weight percent. These are set forth below in Table 2 and also shown in graphical form in FIG. 1.

TABLE 2

| | EXAMPLE | | | | | | |
|---|---|---|---|---|---|---|---|
| | 1.1 | 1.2 | 1.3 | 1.4 | C1.1 | C1.2 | C1.3 |
| | Curing Temperature | | | | | | |
| Dwell Time in Seconds | 70° C. | 80° C. | 90° C. | 100° C. | 80° C. | 90° C. | 100° C. |
| | Extractables, wt. % | | | | | | |
| 0 | 100 | 100 | 100 | 100 | 100 | 100 | 100 |
| 1.5 | 62.5 | 23.3 | 8.4 | 4.4 | 57.1 | 38.5 | 24.9 |
| 3 | 31.9 | 6.0 | 3.0 | 2.7 | 44.8 | 22.7 | 8.6 |
| 4.5 | 10.6 | 3.5 | 2.9 | 2.2 | 33.3 | 14.6 | 4.1 |

Example 1.5

The composition of Example 1 was introduced into a container at room temperature, and the viscosity of the composition was measured over time. The results are shown in Table 3.

TABLE 3

BATH VISCOSITY, COMPOSITION OF EXAMPLE 1

| Time | Viscosity, cP |
|---|---|
| 1 hr. | 150 |
| 2 hrs. | 152 |
| 3 hrs. | 156 |
| 5 hrs. | 156 |
| 6 hrs. | 156 |
| 7 hrs. | 158 |
| 8 hrs. | 158 |

Figure 1:
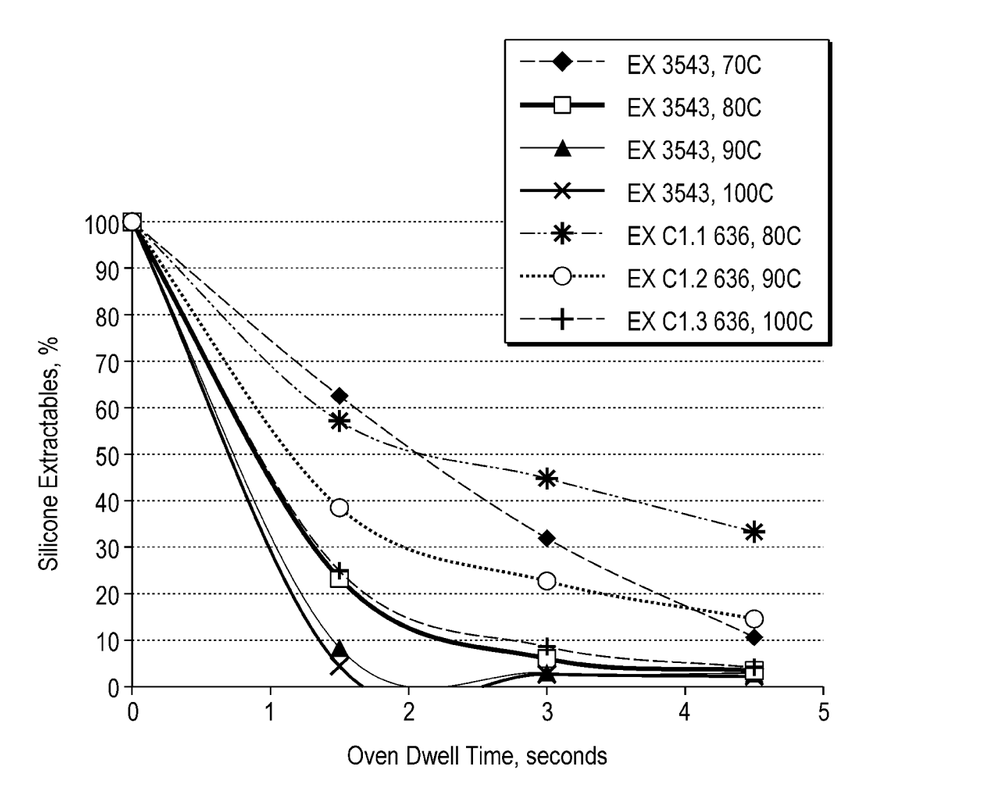
FIG. 1 shows extractables as a function of curing temperature

The results as shown in Table 2 and FIG. 1 indicate that the inventive coating compositions, even at a temperature of 70° C., and with only about 62% of the amount of catalyst as compared with the Comparative Examples, produced the same or lower extractable silicone content as compared to the state-of-the-art examples cured at 100° C. As a result of this improvement, less platinum catalyst, one of the most expensive components of addition-curable organopolysiloxanes, can be used, and more importantly, either lower temperatures in the curing oven, or less dwell time in the curing oven at conventional temperatures, can be used. The result is either or both of higher line speeds and or a more economical process in terms of energy usage and capital equipment. Table 3 shows that the Example 1 composition has a long pot life at room temperature. It may be noted that it is preferable for the oven-treated compositions (cured or partially cured, to contain less than 10% extractables, which is acceptable for some uses, and more preferably less than 5%, a value generally viewed as commercially acceptable. Extractables contents of 3% or less, required in some demanding applications, are also achievable, and preferred.

Example 2 and Comparative Example C2

Release coating compositions were prepared as in Example 1 and Comparative Example 1, using the ingredients set forth in Table 4. Samples were coated, cured for 8 seconds at various temperatures, and measured as in Example 1. The extractables, in weight percent based on coating weight, are the average of two trials of each release coating/cure temperature combination.

TABLE 4

| COMPONENT | COMP. EX. C2 | EXAMPLE 2 |
|---|---|---|
| DEHESIVE ® 636 | 90.4 | |
| Visi 20 | | 66.5 |
| WACKER ® CROSSLINKER 525 | | 32.0 |
| WACKER ® CROSSLINKER V90 | 6.3 | |
| WACKER ® CATALYST C05 | 3.3 | 1.5 |
| [Pt], ppm | 40 | 25 |
| SiH:Vi: | 1.8 | 2.5 |
| CURE TEMP, ° C. | EXTRACTABLES, wt. % | |
| 80 | — | 3.4 |
| 100 | 27.3 | 3.0 |
| 120 | 4.8 | 1.5 |
| 140 | 3.0 | 1.4 |
| 160 | 1.9 | 1.9 |

The releasability was tested by standard methods, at pull rates of 12 inch/min (30.5 cm/min) and 600 inch/min (1.5 m/min), on standard adhesive tapes: Tesa® 4154 and Tesa® 7475. The release forces in g/in (g/25 mm) are given in Table 5 below:

TABLE 5

| | COMP. EX. C2 | EX. 2 |
|---|---|---|
| Tesa ® 4154 @ 12 in/min | 0 (0) | 0 (0) |
| Tesa ® 4154 @ 600 in/min | 9.4 (3.7) | 5.6 (2.2) |
| Tesa ® 7475 @ 12 in/min | 2.1 (0.8) | 2.5 (1.0) |
| Tesa ® 7475 @ 600 in/min | 13.1 (5.2) | 12.6 (5.0) |

Table 5 shows that the inventive compositions provide for release forces comparable to the state of the art compositions.

Example 3 and Comparative Example C3

Release compositions were prepared in the same manner as for Example 1 and Comparative Example 1, using the ingredient in Table 6, coated in the same manner, as in the previous examples, and tested for extractables after curing for various times, as reported in Table 7.

TABLE 6

| COMPONENT/AMOUNT | EX. 3 | COMP. EX. C3 |
|---|---|---|
| Visi 20 | 50.8 | |
| DEHESIVE ® 637 | | 69.7 |
| WACKER ® CROSSLINKER 525 | 47.0 | 28.1 |
| ECH | 0.05 | 0.05 |
| WACKER ® CATALYST C 05 | 2.2 | 2.2 |
| [Pt], ppm | 25 | 25 |
| SiH:Vi | 4.78 | 4.79 |

TABLE 7

| RELEASE COATING OF Cure Temp @ time | | EXAMPLE 3 Extractables, wt. % | COMPARATIVE EXAMPLE 3 Extractables, wt. % |
|---|---|---|---|
| 60° C. | 8 s | 79.4 | 84.7 |
| | 16 s | 31.3 | 65.4 |
| | 24 s | 20.3 | 51.0 |
| 70° C. | 8 s | 52 | 80.2 |
| | 16 s | 21.3 | 47.7 |
| | 24 s | 11.6 | 24.1 |
| 80° C. | 8 s | 42.6 | 61.8 |
| | 16 s | 8.5 | 18.8 |
| | 24 s | 6.1 | 7.0 |
| 90° C. | 8 s | 19.0 | 18.8 |
| | 16 s | 4.9 | 6.7 |
| | 24 s | 4.7 | 4.3 |

What is claimed is:

1. An addition curable organopolysiloxane release coating, comprising:
   A) at least one organopolysiloxane bearing on average, at least two terminal aliphatically unsaturated groups;
   B) at least one organopolysiloxane crosslinker bearing silicon-bonded hydrogen ("Si—H") groups, wherein no more than 67 mol percent of siloxy groups in the organopolysiloxane crosslinker contain Si—H groups;
   wherein at least one organopolysiloxane crosslinker (B) has the formula:

$$H_cR_dSi-O-(SiR_2-O)_p-(SiHR-O)_q-SiR_dH_c, \quad (II)$$

where R is a $C_{1-20}$ hydrocarbon group containing no aliphatic unsaturation, c is 0, d is 3, p is from 10 to 200, and q is from 5 to 60, where the p diorganosiloxy group, and q hydrogen organosiloxy groups are distributed in any manner;
   C) at least one hydrosilylation catalyst; and
   D) optionally, a hydrosilylation inhibitor,
wherein the chain length of the organopolysiloxanes crosslinker B) exceeds the chain length of the organopolysiloxanes A), and the mol ratio of Si—H groups to aliphatically unsaturated groups is at least about 2:1.

2. The addition curable organopolysiloxane release coating composition of claim 1, further comprising one or more additives selected from the group consisting of dyes, pigments, fillers, plasticizers, antioxidants, light stabilizers, rheology adjusting agents, release adjustment agents, and biocides.

3. The addition curable organopolysiloxane release coating composition of claim 1, wherein the composition contains one or more organopolysiloxanes different from components (A) and (B).

4. The addition curable organopolysiloxane release coating composition of claim 1, wherein organopolysiloxane (A) comprises at least one organopolysiloxane (I) having the formula:

(I)

where a is 1 or 2, b is 1 or 2, and the sum of a+b is 3; m is 5 to 200, n is 0-10;
$R^1$ is an aliphatically unsaturated hydrocarbon group;
R is a $C_{1-20}$ hydrocarbon group containing no aliphatic unsaturation;
$R^3$ is R or an organosiloxy or polyorganosiloxy group containing —$OSiR_2$— siloxy groups and terminated by an $R_3SiO$— group or by a $R^1{}_aR_bSiO$— group, where a, b, and the sum a+b have the meanings previously given.

5. The addition curable organopolysiloxane release coating composition of claim 4, wherein from 1 to 5 $R^3$ are siloxy or polysiloxy groups of the formula III:

(III)

wherein o is from 0 to 50.

6. The addition curable organopolysiloxane release coating composition of claim 4, wherein all $R^3$ are R.

7. The addition curable organopolysiloxanes release coating of claim 4, wherein at least one organopolysiloxane crosslinker (B) has the formula:

(II)

where R is as defined previously, p is from 40 to 100, and q is from 5 to 60, where the p diorganosiloxy groups, and q hydrogen organosiloxy groups are distributed in any manner.

8. A method of preparing a release material, comprising:
a) supplying a substrate;
b) applying a release coating composition of claim 7 to the substrate; and
c) curing the release coating composition.

9. The addition curable organopolysiloxane release coating composition of claim 4, wherein from 1 to 5 $R^3$ are siloxy or polysiloxy groups of the formula III:

(III)

wherein o is from 1 to 30.

10. The addition curable organopolysiloxane release coating composition of claim 1, wherein the chain length of organopolysiloxane (I) as reflected by the number of siloxy groups, is from 5 to 200, and the chain length of the organopolysiloxane crosslinker (II) as reflected by the number of siloxy groups, is from 15 to 260 and is longer than the chain length of organopolysiloxane (I).

11. A release material, comprising a substrate coated with a cured release coating composition of claim 1.

12. The release material of claim 11, wherein the substrate comprises one or more of paper or polyolefin.

13. The release material of claim 11, wherein the substrate comprises a polyolefin polymer.

14. A method of preparing a release material, comprising:
a) supplying a substrate;
b) applying a release coating composition of claim 1 to the substrate; and
c) curing the release coating composition.

* * * * *